(12) United States Patent
Kim (10) Patent No.: US 6,700,628 B1
(45) Date of Patent: Mar. 2, 2004

(54) DEVICE AND METHOD FOR CONTROLLING BRIGHTNESS OF IMAGE SIGNAL

(75) Inventor: Sang Yeon Kim, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/567,103

(22) Filed: May 8, 2000

(30) Foreign Application Priority Data

May 8, 1999 (KR) ......................................... 1999/16465

(51) Int. Cl.[7] .............................. H04N 5/14; H04N 5/52; G06K 9/00
(52) U.S. Cl. ....................... 348/687; 348/672; 348/671; 348/678; 382/169; 382/274; 382/168
(58) Field of Search ................................ 348/687, 688, 348/672, 671, 678; 382/168, 169, 171, 172, 274, 254; 358/522, 455, 447

(56) References Cited

U.S. PATENT DOCUMENTS

| 4,352,105 A | * | 9/1982 | Harney | 343/5 |
|---|---|---|---|---|
| 5,675,624 A | * | 10/1997 | Relihan et al. | 378/98.7 |
| 5,680,477 A | * | 10/1997 | Asada | 382/169 |
| 5,862,254 A | * | 1/1999 | Kim et al. | 382/168 |
| 5,923,383 A | * | 7/1999 | Kim | 348/672 |
| 5,937,090 A | * | 8/1999 | Kim | 382/169 |
| 5,949,918 A | * | 9/1999 | McCaffrey | 382/274 |
| 5,963,665 A | * | 10/1999 | Kim et al. | 382/169 |
| 6,018,588 A | * | 1/2000 | Kim | 382/167 |
| 6,075,890 A | * | 6/2000 | Park | 382/169 |
| 6,130,724 A | * | 10/2000 | Hwang | 348/678 |
| 6,219,447 B1 | * | 4/2001 | Lee | 382/168 |
| 6,259,472 B1 | * | 7/2001 | Park | 348/28 |

* cited by examiner

Primary Examiner—John Miller
Assistant Examiner—Paulos Natnael
(74) Attorney, Agent, or Firm—Birch, Stewart, Kolasch & Birch, LLP (57) ABSTRACT

A device and method for controlling a brightness of an image signal in a moving picture transmission/reception system is disclosed. The present invention includes a control point detecting unit for receiving an image, calculating a Cumulative Density Function from two most significant bits of the image, dividing an axis into a required number of portions, and detecting a required number of control points. The present invention also includes an image signal brightness controlling unit for calculating and dividing six least significant bits of the image and a signal from the control point detecting unit for controlling a next frame of the image.

18 Claims, 8 Drawing Sheets

DEVICE AND METHOD FOR CONTROLLING BRIGHTNESS OF IMAGE SIGNAL

BACKGROUND OF THE INVENTION

Field of the Invention

The present invention relates to controlling an image signal in a moving picture transmission and reception system, and more particularly, to a device and method for controlling a brightness of an image signal in a moving picture transmission and reception system.

A moving picture transmission/reception system is implemented with a transmission unit and a reception unit. The transmission unit converts an optical energy sensed by a camera into an electric signal and transmits the signal after either an analog or digital signal processing, and coding. The reception unit then displays a moving picture through a reverse process of the transmission unit. However, an object in the image displayed through the above process may appear differently from the actual object. Also, it is sometimes necessary to display the original image in a form altered by a person or device. In such case, various post-processing methods must be used before displaying the image.

Figure 1:
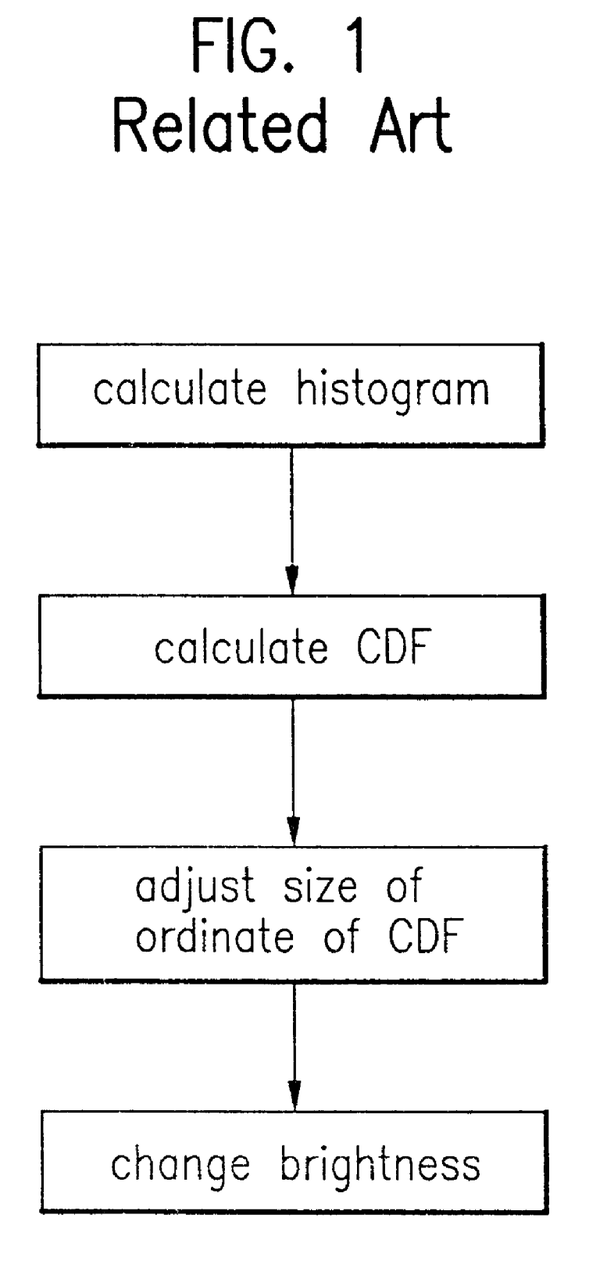
FIG. 1 is a flow chart showing a process for equalizing a histogram according to a method in the related art for controlling a brightness of an image signal.
Figure 2A:
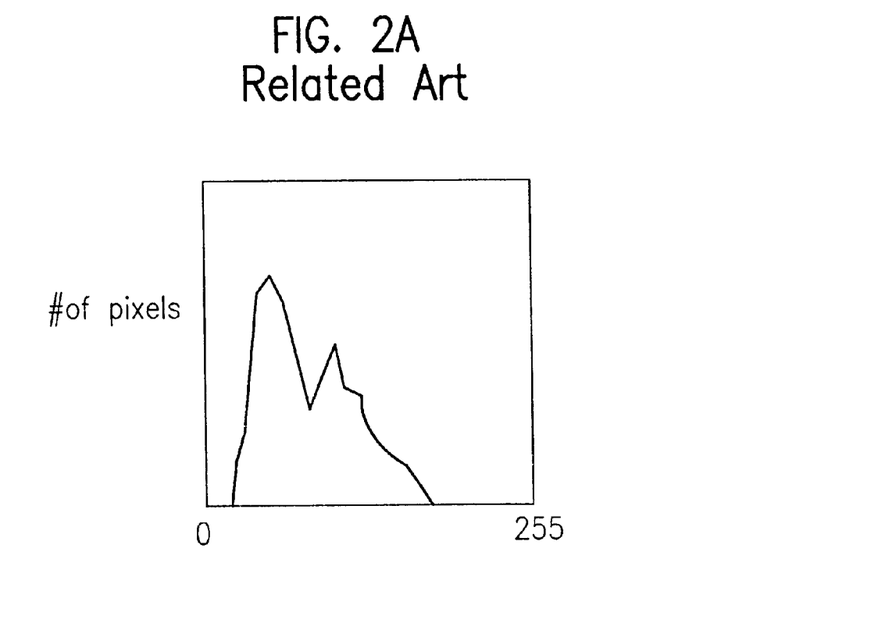
FIGS. 2A–2D are examples of a histogram and a CDF for a dark image and a bright image in the related art.
Figure 2B:
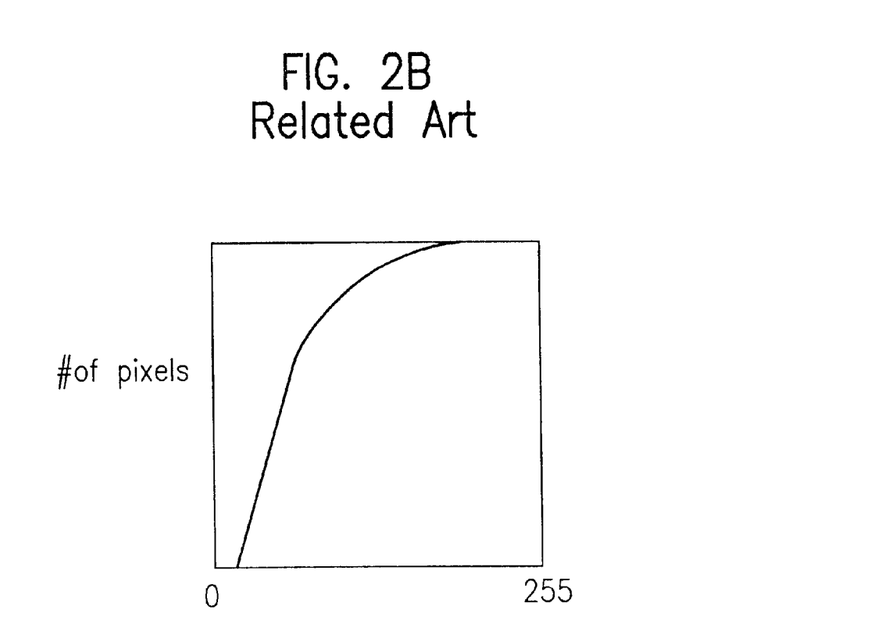

A method in the related art for controlling a brightness of an image in a moving picture transmission/reception system will be explained with reference to the figures. Particularly, FIG. 1 illustrates a flow chart of a process for equalizing a histogram to control a brightness of an image signal in this context. FIGS. 2A and 2B show an example of a histogram and a cumulative density function (CDF) curve obtained from a relatively dark image according to a related art while FIGS. 2C and 2D show an example of a histogram and a CDF curve obtained from a relatively bright image according to a related art.

Figure 2C:
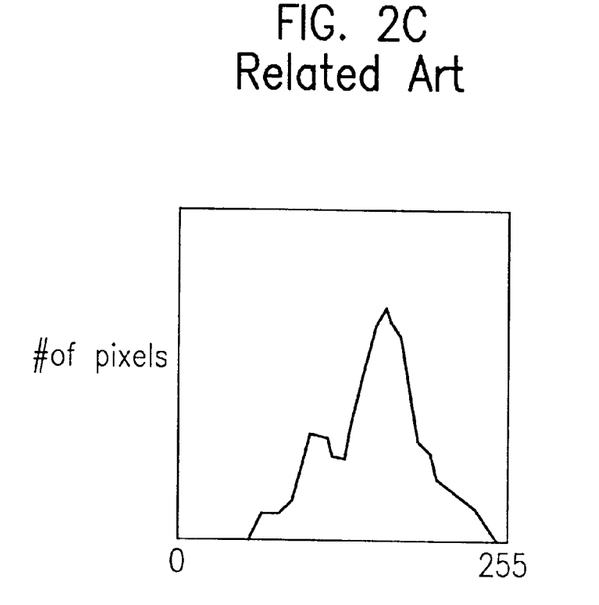
Figure 2D:
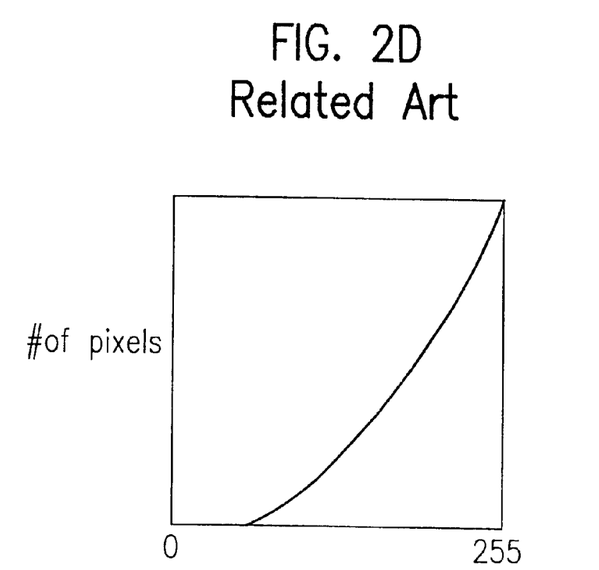

Referring to FIG. 1, a method for controlling a brightness of an image in the related art begins by calculating a histogram of the brightness signal in one frame of the input still image as in FIGS. 2A and 2C, and then calculating a CDF of the histogram as in FIGS. 2B and 2D. Thereafter, a contrast conversion is executed by scaling the ordinate, i.e. the number of pixels, of the CDF curve to fit within a range of 0~255 and using the scaled ordinate as a transfer characteristic.

However, when a luminance signal is expressed in 8 bits, the above method in related art becomes substantially cumbersome in that 256 counters are required to calculate and store a histogram, to thereby control the brightness.

SUMMARY OF THE INVENTION

Accordingly, an object of the present invention is to solve at least the problems and disadvantages of the related art.

An object of the present invention is to provide a device and method for efficiently controlling a brightness of an image in a moving picture transmission/reception system.

Another object of the present invention is to provide a device and method for controlling a brightness of an image in a moving picture by controlling a partial or an overall brightness of an image based upon the brightness of the image.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a device for controlling a brightness of an image signal according to one embodiment of the present invention includes a control point detecting unit which receives an image and obtains a CDF of a frame of the image, divides an abscissa of the CDF into a required number of portions, and detects control points resulting from the division; and an image signal brightness controlling unit which calculates a change in a brightness of a frame of the image based upon the CDF and the control points. The device may further comprise a frame buffer which stores an input frame while the control point detecting unit obtains a CDF and control points of the input frame such that the image signal brightness controlling unit calculates a change in brightness of the input frame from the frame buffer based upon the CDF and control points of the input frame. Alternatively, the control point detecting unit may obtain a CDF and control points for a nth frame of the image; and the image signal brightness controlling unit may calculate a change in brightness of a nth frame of the image based upon the CDF and control points obtained using a (n−1)th frame of the image.

In another embodiment of the present invention, a device for controlling a brightness of an image signal includes a control point detecting unit which obtains a CDF of a frame of an input image, divides the CDF into a required number of portions, and detects control points resulting from the division to output a plurality of comparison signals and to set latch values; and an image signal brightness controlling unit which calculates a change in a brightness of the frame of the input image based upon the plurality of comparison signal from the control point detecting unit and based upon latch values set using a CDF of a previous frame of the input image.

In the above embodiment, the control point detecting unit includes a comparing unit which compares a plurality of most significant bits (MSBs) of the input image to a plurality of preset values and outputs the plurality of comparison signals; a first counting unit which counts the total number of pixels in the frame of the input image; a second counting unit which counts each of the plurality of comparison signals from the comparing unit according to a clock p_clk; a normalizing unit which selects each one of the count values from the counting unit in response to a count control signal count_control and multiplies a selected count value with a quotient from the maximum range or value of brightness divided by the number of pixels in the frame of the input image to output corresponding normalized count values; a latching unit which latches a plurality of stored latch value signals; and a latch value setting unit which sets a plurality of latch values based upon the normalized count values.

The latch value setting unit may include a signal selector which selects one of the plurality of preset values in response to the count control signal count_control; a first adder which adds a selected preset value to a normalized count value from the normalizing unit; a multiplier which multiplies a scaling signal hm_scale with a first sum from the first adder; and a second adder which adds the selected preset value to a signal from the multiplier and outputs a second sum as a latch value. Alternatively, however, the latch value setting unit may include a second signal selecting unit which selects one of either the latch value from the second adder or a preset latch value, in response to a user selecting signal user_select, and stores the selected latch value in the latching unit. This allows a brightness control of a partial region in a frame of a image.

Also, the image signal brightness controlling unit includes a signal selection logic unit which performs a selection logic in response to a comparison signal from the comparing unit and forwards a selection logic signal; a signal selector which selects at least one latch value signal in response to the selection logic signal; a first multiplier which multiplies a plurality of least significant bits (LSBs) of the image with a first signal from the signal selector; an operator which subtracts the six LSBs of the image from a preset value; a second multiplier which multiplies a second signal from the signal selector with a signal from the operator; an adder which adds the signals from the first and second multipliers; and a shifter which shifts a signal from the adder.

A method for controlling a brightness of an image in accordance to the present invention includes obtaining a CDF of a frame of the input image, dividing an abscissa of the CDF into a required number of portions, and detecting control points resulting from the division; and calculating a change in a brightness of a frame of the image based upon the CDF and the control points. The method may include storing an input frame while obtaining a CDF and control points of the input frame and then calculating a change in brightness of the input frame based upon the CDF and control points of the input frame. Alternatively, the method may obtain a CDF and control points of a nth frame of the image, but calculate a change in brightness of a nth frame of the image based upon the CDF and control points obtained using a (n–1)th frame of the image.

Another embodiment of the method for controlling a brightness of an image signal in accordance with the present invention includes obtaining a CDF of a frame of an input image, dividing the CDF into a required number of portions, and detecting control points resulting from the division to output a plurality of comparison signals and to set latch values; and calculating a change in a brightness of the frame of the input image based upon the plurality of comparison signals from the control point detecting unit and based upon latch values set using a CDF of a previous frame of the input image.

The CDF may be obtained by comparing a plurality of MSBs of the input image to a plurality of preset values and outputting the plurality of comparison signals; counting a number of pixels in the frame of the input image; counting each of the plurality of comparison signals according to a clock p_clk; normalizing the count values by selecting each one of the count values from the counting unit in response to a count control signal count_control and multiplying a selected count value with a quotient from the maximum range or value of brightness divided by the number of pixels in the frame of the input image to output corresponding normalized count values.

Also, the latch values may be set and stored based upon the normalized count values. Namely, the latch values may be set by selecting one of the plurality of preset values in response to the count control signal count_control; adding a selected preset value to a normalized count value and outputting a first sum; multiplying a scaling signal hm_scale with the first sum; and adding the selected preset value to a product value and outputting a second sum as a latch value to be stored. Alternatively, setting the latch values may include selecting one of either the calculated latch value or a preset latch value, in response to a user selecting signal user_select, and storing the selected latch value.

Finally, the brightness of a frame may be calculated by performing a selection logic in response to a comparison signal and forwarding a selection logic signal; selecting at least one latch value signal in response to the selection logic signal; multiplying a plurality of LSBs of the input image with a first selected latch value signal; subtracting the plurality of LSBs of the image from a preset value; multiplying a second selected latch value signal with a signal resulting from the subtraction; adding the signals from the two multiplications; and shifting the resultant signal.

BRIEF DESCRIPTION OF THE DRAWINGS

These and other objects of the present invention will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention will be described in detail with reference to the following drawings in which like reference numerals refer to like elements wherein.

DETAILED DESCRIPTION OF THE PREFERRED EMBODIMENTS

Figure 3:
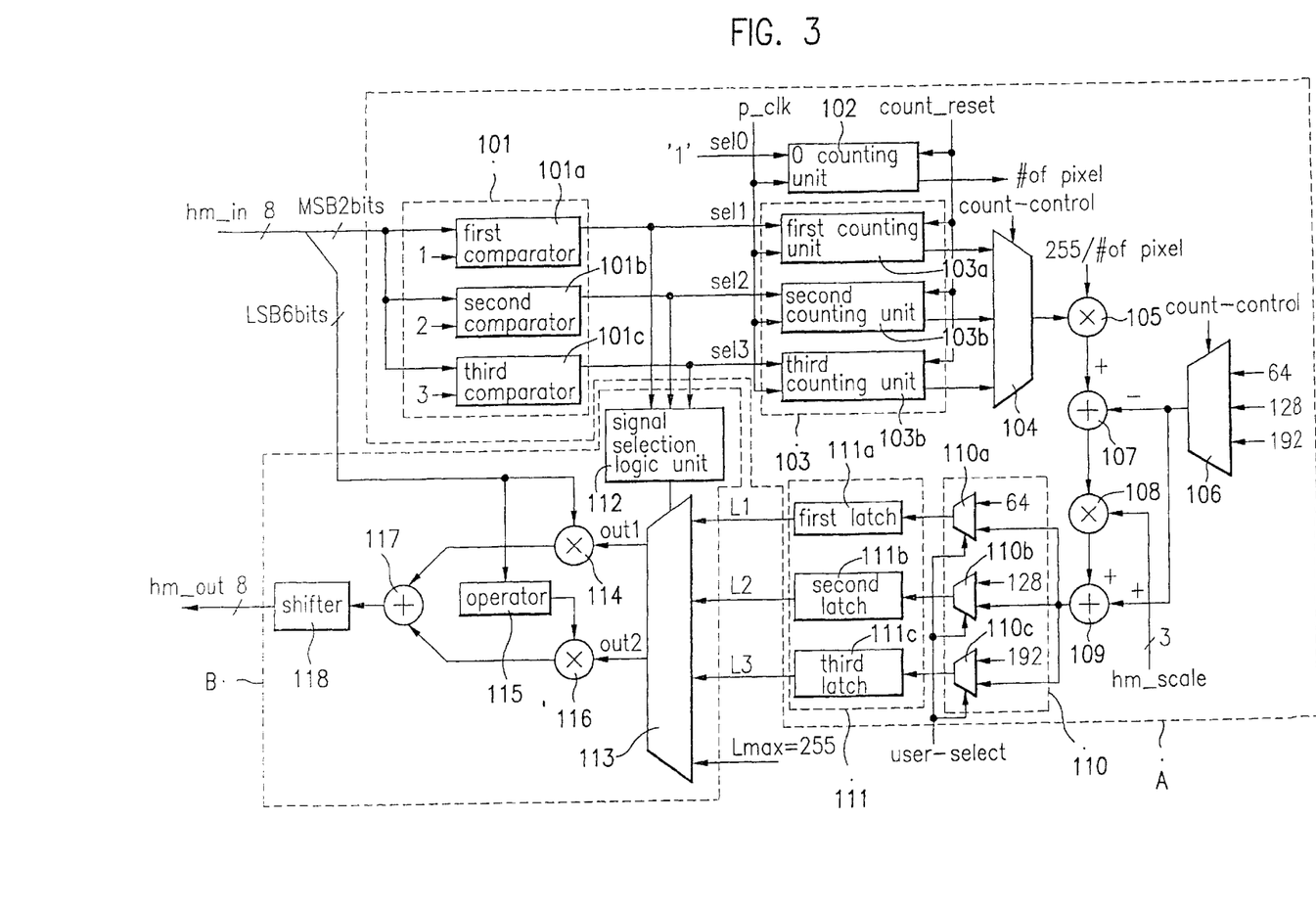
FIG. 3 is a device for controlling a brightness of an image in a moving picture transmission/reception system in accordance with a preferred embodiment of the present invention.

Reference will now be made in detail to the preferred embodiments of the present invention, examples of which are illustrated in the accompanying drawings. FIG. 3 illustrates a device for controlling a brightness of an image in a moving picture transmission/reception system in accordance with a preferred embodiment of the present invention.

Referring to FIG. 3, the device for controlling a brightness of an image signal in a moving picture transmission/reception system in accordance with a preferred embodiment of the present invention includes a control point detecting unit A which receives an image and calculates a CDF from two MSBs of the image, divides an abscissa into a required number of portions, and detects the number and values of control points resulting from the division; and an image signal brightness controlling unit B which calculates a change of brightness using the control points to control a brightness of the next frame of the image.

The control point detecting unit A includes a comparing unit 101 which compares the two MSBs of an input image signal hm_in to a plurality of preset values; a first counting unit 102 which counts the number of '1's in the input a frame of the image; a second counting unit 103 which counts signals from the comparing unit 101 according to a clock p_clk; a first signal selector 104 which selects one of the signals counted at the second counting unit 103 in response to a count control signal count_control; a first multiplier 105 which multiplies the signal from the first signal selector 104 with a quotient of 255/(# of pixels); a second signal selector 106 to the signal from the first multiplier 105; a second multiplier 108 which multiplies a scaling signal hm_scale and the signal selector 106 to a signal from the second multiplier 108; a third signal selecting unit 110 which selects either a signal from the second adder 109 or a default value (e.g., 64, 128 or 192) in response to a user selecting signal user_select; and a latching unit 111 which latches a signal from the third signal selecting unit 110.

The image signal brightness controlling unit B includes a signal selection logic unit 112 which performs a selection logic in response to a signal from the comparing unit 101 and forwards a result of the comparison; a fourth signal selector 12 which selects a signal from the latching unit 111 in response to a signal from the signal selection logic unit 112; a multiplier 114 which multiplies the 6 LSBs of the image and a signal from the fourth signal selector 113; an operator 115 which subtracts the 6 bit value of the image from a preset value and forwards a result of the subtraction; a fourth multiplier 116 which multiplies a signal from the fourth signal selector 113 and a signal from the operator 115; an adder 117 which adds signals from the third and fourth multipliers 114 and 116; and a shifter 118 which shifts a signal from the third adder 117 and thereby generating an output signal hm_out.

Figure 4A:
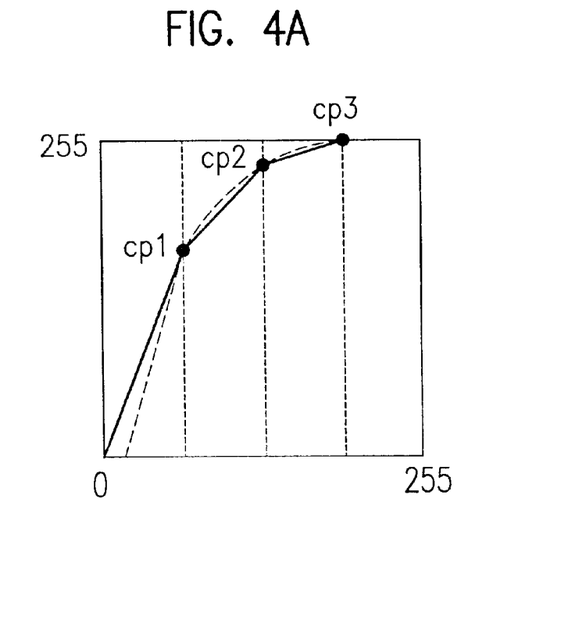
FIGS. 4A–4B are examples of a CDF for a dark image and a bright image according to an embodiment of the present invention.
Figure 4B:
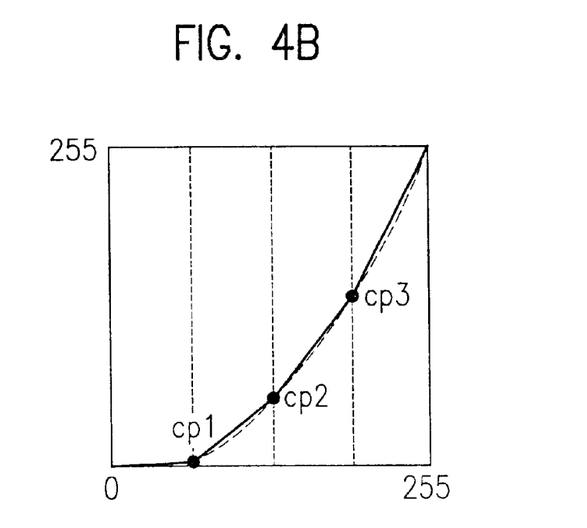

For purposes of explanation, FIG. 3 shows the comparing unit 100 for a process which divides an abscissa of an image in 8 bits into four portions (0~63, 64~127, 128~191, and 192~255) as shown in FIGS. 4A and 4B, and which controls a partial or overall brightness of the image based upon a maximum range of brightness 255, two MSBs, six LSBs, and three control points cp1, cp2, and cp3. In such case, the comparing unit 101 of the preferred embodiment of the control point detecting unit A, includes a plurality of comparators corresponding to the number of control points. Thus, the comparing unit 101 for three control points includes a first comparator 101a which compares the 2 MSBs of the image to a first preset value and forwards a result of the comparison; a second comparator 101b which compares the 2 MSBs of the image to a second preset value and forwards a result of the comparison; and a third comparator 101c which compares the 2 MSBs of the image and a third preset value and forwards a result of the comparison. With three control points, the first, second and third preset values are set to '1,' '2,' and '3' respectively, as only two MSBs out of the eight bits are used during the comparison.

Also, the second counting unit 103 includes a plurality of counters corresponding to the number of control points and includes, in this example, a first counter 103a which counts signals from the first comparator 101a and forwards the count value; a second counter 103b which counts signals from the second comparator 101b and forwards the count value; and a third counter 103c which counts signals from the third comparator 101c and forwards the count value. Similarly, the third signal selecting unit 110 includes a plurality of multiplexers corresponding to the number of control points and includes, in this example, a first multiplexer 110a which forwards a signal from the second adder 109 or the first preset value depending on the user selecting signal user_select; a second multiplexer 110b which forwards a signal from the second adder 109 or the second preset value depending on the user selecting signal user_selecting; and a third multiplexer 110c which forwards a signal from the second adder 109 or the third preset value depending on the user selecting signal user_selecting. Finally, the latching unit 111 includes a plurality of latches corresponding to the number of control points. Thus, for three control points, the latching unit 111 includes a first latch 111a which latches a signal from the first multiplexer 110a and the forwards the latched signal; a second latch 111b which latches a signal from the second multiplexer 110b and forwards the latched signal; and a third latch 111c which latches a signal from the third multiplexer 110c and forwards the latched signal.

Figure 5:
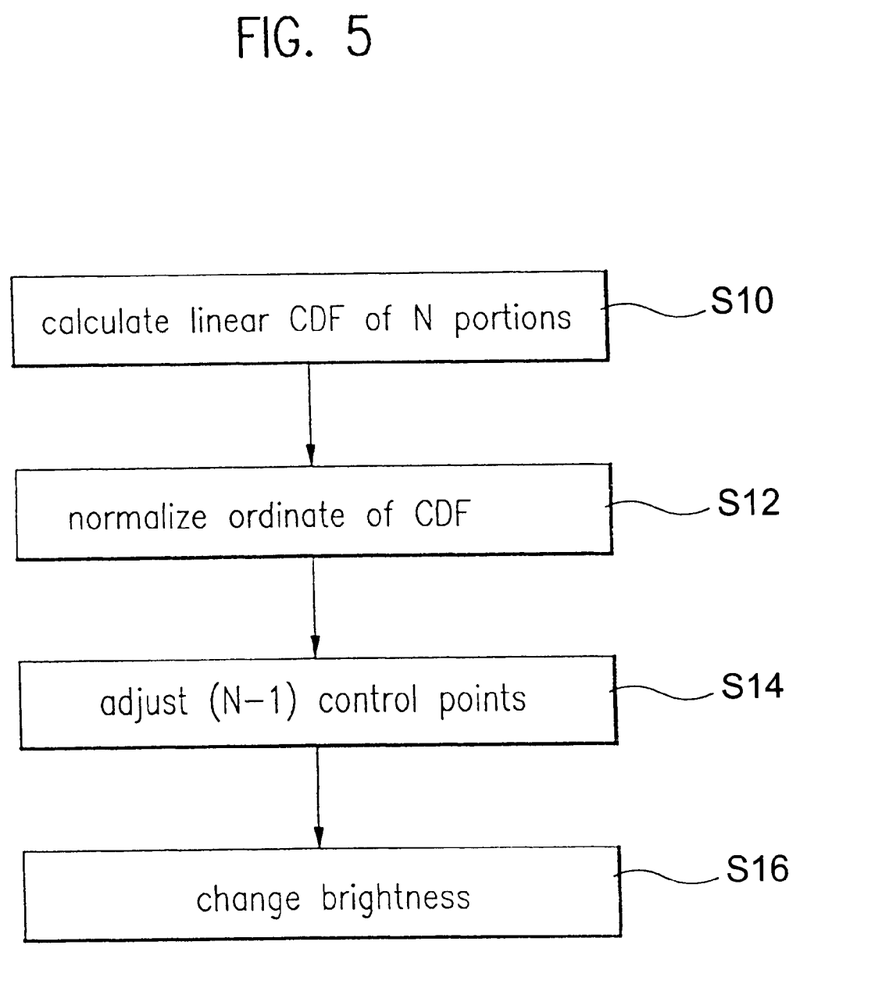
FIG. 5 is a flow chart showing a general process for controlling a brightness of an image in a moving picture transmission/reception system in accordance with an embodiment of the present invention.

FIG. 5 is a flow chart showing a general process for controlling a brightness of an image signal in a moving picture transmission/reception system in accordance with the device shown in FIG. 3. Essentially, by calculating a linear CDF curve of N portions and adjusting the ordinate range of the CDF, i.e. normalizing the CDF curve, the brightness of an image may be changed using (N−1) control points. In the preferred embodiment, a CDF is calculated (S10) while a vertical synchronization signal of the frame is high, and the normalization (S12) and adjustment (S14) of the CDF is performed while the vertical synchronization signal is low. Therefore, a calculated CDF curve of a previous frame is utilized to change the brightness of a current frame (S16).

Figure 6A:
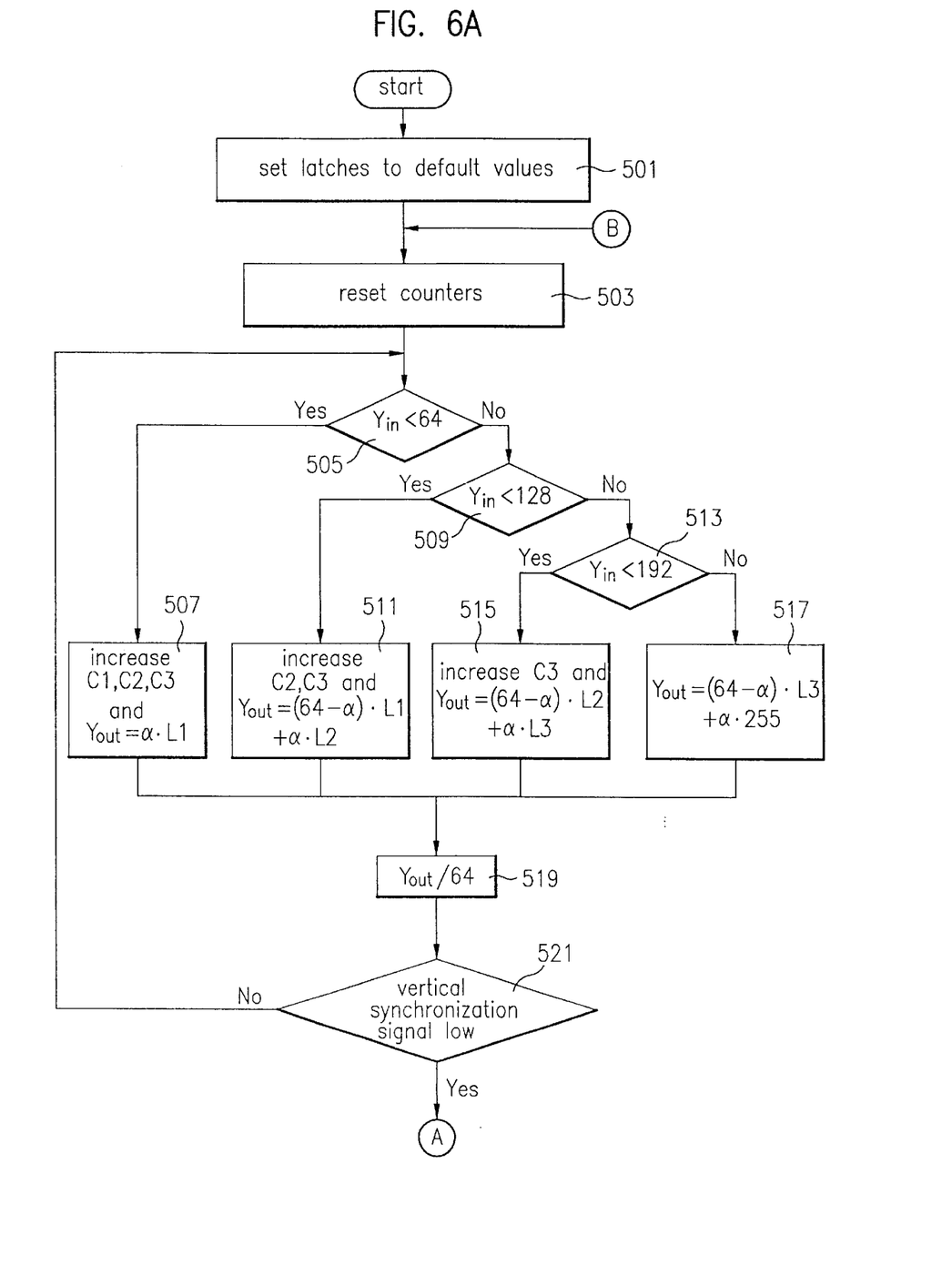
FIGS. 6A–6B illustrate a method for controlling a brightness of an image in a moving picture transmission/reception system in accordance with a preferred embodiment of the present invention.
Figure 6B:
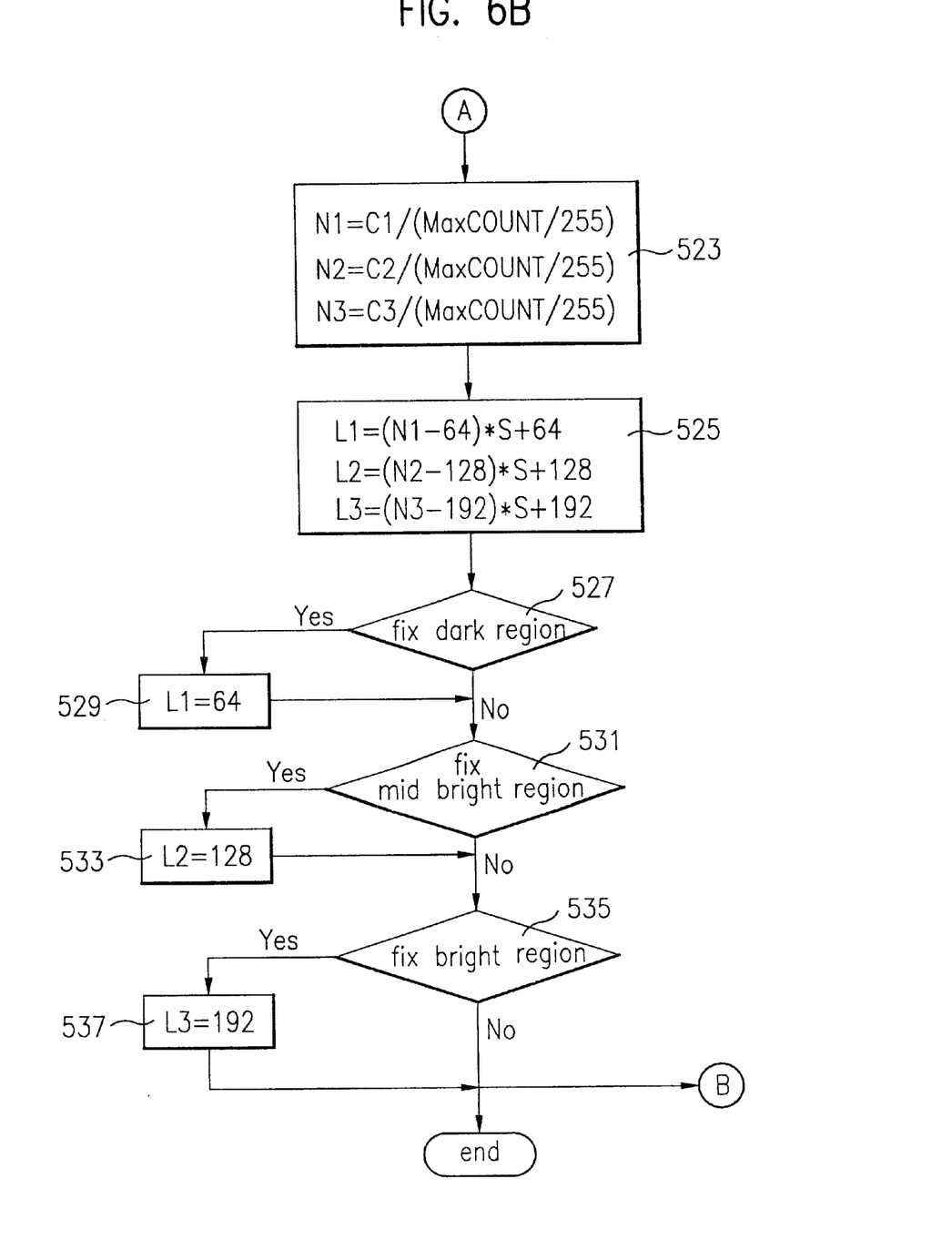

Particularly, FIGS. 6A~6B illustrate a method for controlling a brightness of an image signal in a moving picture transmission/reception system in accordance with the device shown in FIG. 3 according to an embodiment of the present invention. The operation of the device and method for controlling the brightness of an image signal in a moving picture transmission/reception system will next be explained with reference to the figures.

Referring to FIG. 6A, during an initialization of the control point detecting unit A, the first counting unit 102 is reset to '0' (503) and the latching unit 111 is initialized to default value(s) (501). Namely, the first latch 111a set to the first control point 64, the second latch 111b is set to the second control point 128, and the third latch 111c is set to the third control point 192. Thereafter, when a frame is input, the comparing unit 101 compares the pixels of the frame, i.e. the image, with the plurality of preset values and forwards the result of the comparison. That is, the first comparator 101a compares the 2 MSBs of the image with the preset value of 1, the second comparator 101b also compares the 2 MSBs of the image with the preset value of 2, and the third comparator 101c compares the 2 MSBs of the image with the preset value of 3.

The first counting unit 102 then counts the number of '1's in each frame of the image to determine the total number of pixels in the frame and forwards the resultant count value. The second counting unit 103 counts a signal from the first comparing unit 101 according to a parallel clock p_clk and forwards the resultant count value. That is, the first counter 103a counts according to a parallel clock p_clk, where the signal sel1 is high based upon the comparison result of the first comparator 101a. Similarly, the second counter 103b and third counter 103c count according to a parallel clock p_clk, where signals sel2 and sel3 are high, respectively based on the comparison results of the second and third comparators 101b and 101c. Here, sel1 is high when the 2 MSBs of the image is less than the first preset value, sel2 is high when the 2 MSBs of the image is less than the second preset value, and sel3 is high when the 2 MSBs of the image is less that the third preset value.

Thus, depending upon the result of the comparison in the comparing unit 101, the count value of the first to third counters 103a~103c be increased in the second counting unit 103. Particularly, if a pixel value is smaller than the preset value of 64 (505), the count values C1~C3 of the first to third counters 103a~103c are increased (507). If a pixel value is between 64 and 127 (509), the count values C2 and C3 of the second and third counters 103b and 103c are increased (511). If a pixel is between 128~191 (513), the count value C3 of the third counter 103c is increased (515). Such count values of a current frame are used to obtain a CDF curve to be applied in the next frame. Parts of steps 507, 511, 515, 517 and step 519 will be discussed later.

While the control point detecting unit A is operating, the brightness of the pixels currently being input are also changed based upon the preset values of the latching unit 111, according to the result of the comparison in the comparing unit 101. Once the pixels of a frame of an image is input and processed, a vertical blanking occurs, i.e. the vertical synchronization signal becomes low (521). During the vertical blanking, the counting units 102 and 103 are reset, and the values of the latching unit 111 are updated as shown in FIG. 6B using the CDF curve obtained through the first and second counting units 102 and 103. Thus, the brightness of the pixels of a next frame would be changed based upon the updated values of the latching unit 111. The process of resetting the values of the latching unit 11 will next be explained.

However, the preferred embodiment first normalizes or equalizes the obtained CDF curve (523) for an enhanced display of the image. Referring FIG. 6B, the first signal selector 104 selects one of the counted signals C1~C3 from the second counting unit 103 in response to the count control signal count_control, and forwards the selected count value. The first multiplier 105 multiplies the selected count value with a quotient of 255/MaxCount, where MaxCount is the total number of pixels in a frame, and forwards a result of the multiplication. Each of the counted signals C1~C3 are selected and processed as above to normalize the CDF curve.

After normalization, each value of the latching unit 111 is set (525). Particularly, the second signal selector 106 selects a corresponding one of the plurality of the preset values according to the count control signal count_control and forwards the selected preset value. Thus, the first adder 107 subtracts the signal from the first multiplier 105 to the signal from the second signal selector 106 and forwards the result. The second multiplier 108 multiplies a scaling signal hm_scale S with the signal from the first adder 107 and forwards a result of the multiplication. Finally, the second adder 109 adds the signal from the second signal selector 106 to a signal from the second multiplier 108 and forwards the sum.

Accordingly, the values L1~L3 of the first to third latches 111a~111c are initially set as in Equation 1 where S is a value between '0' and '1.'

$$L1 = (N1-64)*S+64$$

$$L2 = (N2-128)*S+128$$

$$L3 = (N3-192)*S+192$$

Thus, a change in the brightness may be adjusted by changing the default values of the first to third latches 111a~111c. Namely, the value of S may be varied to adjust the brightness change. The degree of change in the brightness is smaller as S gets closer to '0' while the degree of change is greater as S nears '1'. Thus, the calculated values of the first to third latches 111a~111c are used for controlling the brightness of the next frame.

Moreover, by fixing some of the values of the first to third latches 111a~111c to default values such as 64, 128 and 192 respectively, a partial brightness control is possible. For example, to maintain the brightness of a dark portion while increasing a contrast of a comparatively bright portion, the first multiplexer 110a of the third signal selecting unit 110 is controlled such that a default value is loaded to the first latch 111a (527 and 529). To maintain the brightness of a mid bright portion, the second multiplexer 110b is controlled such that a default value is loaded to the second latch 111b (531 and 533) and to maintain the brightness of a bright portion, the third multiplexer 110c is controlled such that a default value is loaded to the third latch 111c (535 and 537). Accordingly, if the first to third multiplexers 110a~110c are all fixed to the preset values, the brightness would not change. By selecting between a preset value and the signal from the second adder 109, a partial brightness control is achieved.

Therefore, the third signal selecting unit 110 selects a signal from the second adder 109 or a preset value in response to the user selection signal user_select and forwards the selection. Namely, the first multiplexer 110a of the third signal selecting unit 110 forwards either the signal from the second adder 109 or the preset value of 64 depending upon the user selection signal user_select. The second multiplexer 110b forwards either a signal from the second adder 109 or the preset value of 128 depending upon the user selection signal user_select. Similarly, the third multiplexer 110c forwards either a signal from the second adder 109 or the preset value of 192 depending upon the user selection signal user_select.

Thereafter, the latching unit 111 latches a signal from the third selecting unit 110 and forwards a result of the latching. Particularly, the first latch 111a latches a signal from the first multiplexer 110a and forwards a latched signal, the second latch 111b latches a signal from the second multiplexer 110b and forwards a latched signal, and the third latch 111a latches a signal from the third multiplexer 110c and forwards a latched signal. Thus, through the foregoing process, values of the first to third counters 103a~103c of the second counting unit 103 are normalized during a vertical blanking period and stored in the first to third latches 111a~111c of the latching unit 111. In the preferred embodiment, the normalization is made by dividing 255 (8 bit image) with a number of pixels in a frame and multiplying the quotient to the values from the first to third counters 103a~103c of the second counting unit 103.

Referring back to FIG. 3, the signal selection logic unit 112 of the image signal brightness controlling unit B executes a selection logic to change a brightness of a current input pixel in response to the signals sel1~sel3 from the comparing unit 101 and forwards the selection logic. The fourth signal selector 113 then selects signals from the latching unit 11 according to the signal selection logic unit 112 and forwards a selection. Particularly, the fourth signal selector 113 selects a signal from the latching unit 111 according to Table 1 below.

TABLE 1

| Sel 1 | Sel 2 | Sel 3 | Out1 | Out2 |
|---|---|---|---|---|
| F | F | F | Lmax | L3 |
| F | F | T | L3 | L2 |
| F | T | T | L2 | L1 |
| T | T | T | L1 | 0 |

Thereafter, the third multiplier 114 multiplies the 6 LSBs value of the image a and the signal Out1 from the fourth signal selector 113, and forwards the result of the multiplication. The operator 115 subtracts the 6 LSBs value α from 64, and forwards the result of the subtraction. Thereafter, the fourth multiplier 116 multiplies the signal Out2 from the fourth signal selector 113 with the signal from the operator 115, and forwards the result of the multiplication. The third adder 117 adds the signal from the third multiplier 114 to the signal from the fourth multiplier 116 and forwards the resultant sum. Finally, the shifter 118 shifts and forwards the signal from the third adder 117.

Namely, when a current frame is being input, the fourth signal selector 113 selects the appropriate signals to control the brightness of input pixels using the latch values L1~L3 set by a previous frame, as shown in FIG. 6A (507, 511, 515 or 517, and 519). The brightness of input pixels are controlled, according to Equations (2) to (5), where Yin is the current brightness of the image and α is the 6 LSBs value of a brightness signal Yin.

$$Yout = [(64 - \alpha) * 0 + \alpha * L1]/64, \quad \text{where } Yin < 64 \quad (2)$$

$$Yout = [(64 - \alpha) * L1 + \alpha * L2]/64, \quad \text{where } 64 \leq Yin < 128 \quad (3)$$

$$Yout = [(64 - \alpha) * L2 + \alpha * L3]/64, \quad \text{where } 128 \leq Yin < 192 \quad (4)$$

$$Yout = [(64 - \alpha) * L3 + \alpha * 255]/64, \quad \text{where } 192 \leq Yin \quad (5)$$

As a result, a brightness of a current frame is controlled using a CDF curve obtained from a previous frame and a CDF curve of a current frame is obtained to be used for the next frame. Although the preferred embodiment of the present invention applies information on a histogram calculated for a present frame to a next frame of the image, a significant problem is not caused because the brightness distribution between adjacent frames is generally similar. However, information on a histogram calculated for a present frame may be directly applied to the present frame with an additional frame memory to temporarily store the present frame while the CDF of the present frame is calculated. Also, the preferred embodiment divides the abscissa of the CDF into four positions, resulting in three control points. However, to approximate the CDF more accurately or to control the brightness more precisely, the abscissa of the CDF may be further divided.

As explained above, the device and method for controlling a brightness of an image signal in a moving picture transmission/reception system can provide an optimal contrast by changing partial or overall brightness of an image based on an image histogram. Furthermore, such device and method is applicable to a digital TV, digital camera, DVD player, and other computer application programs.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A device for controlling a brightness of an image comprising:
    a control point detecting unit which receives an image and obtains a cumulative density function (CDF) of a frame of the image, divides an abscissa of the CDF into a required number of portions, and detects control points resulting from the division; and
    an image signal brightness controlling unit which calculates a change in a brightness of a next frame of the image based upon the CDF and the control points,
    wherein the change in the brightness of the next frame of the image is selectively adjusted based on latch values selected between default latch values and calculated latch values, and
    wherein the image signal brightness controlling unit comprises:
        a signal selection logic unit which performs a selection logic in response to a comparison signal from a comparing unit and forwards a selection logical signal;
        a signal selector which selects at least one latch value signal in response to the selection logic signal;
        a first multiplier which multiplies a plurality of LSBs (least significant bits) of the image with a first signal from the signal selector;
        an operator which subtracts the plurality of LSBs of the image from a preset value;
        a second multiplier which multiplies a second signal from the signal selector with a signal from the operator;
        an adder which adds the signals from the first and second multipliers; and
        a shifter which shifts a signal from the adder.

2. A device of claim 1, further comprising a frame buffer which stores an input frame while the control point detecting unit obtains the CDF and control points of the input frame; and
    wherein the image signal brightness controlling unit calculates a change in a brightness of the input frame from the frame buffer based upon the CDF and control points of the input frame.

3. A device of claim 1, wherein the control point detecting unit obtains a CDF and control points of an nth frame of the image; and
    the image signal brightness controlling unit calculates a change in a brightness of the nth frame of the image based upon a CDF and control points of an (n−1)th frame of the image.

4. A device for controlling a brightness of an image signal comprising:
    a control point detecting unit which obtains a cumulative density function (CDF) of a frame of an input image, divides the CDF into a required number of portions, and detects control points resulting from the division to output a plurality of comparison signals and to set latch values; and
    an image signal brightness controlling unit which calculates a change in a brightness of the frame of the input image based upon the plurality of comparison signals from the control point detecting unit and based upon latch values set using a CDF of a previous frame of the input image,
    wherein the latch values are selected between default latch values and calculated latch values, and wherein the control point detecting unit comprises:
  a comparing unit which compares a plurality of MSBs (most significant bits) of the input image to a plurality of preset values and thereby outputs the plurality of comparison signals;
  a first counting unit which counts a number of pixels in the frame of the input image;
  a second counting unit which counts each of the plurality of comparison signals from the comparing unit according to a clock signal;
  a normalizing unit which selects each one of the count values from the second counting unit in response to a count control signal and multiplies a selected count value with a quotient from a maximum range of brightness divided by the number of pixels in the frame of the input image to output corresponding normalized count value;
  a latching unit which latches a plurality of stored latch value signals; and
  a latch value setting unit which sets a plurality of latch values based upon the normalized count values.

5. A device of claim 4, wherein the CDF is divided into four portions resulting in three control points, and wherein the comparing unit compares two MSBs of the input image to three preset values to output three comparison signals based upon the comparisons.

6. A device of claim 5, wherein the three control points are 64, 128, and 192, if the input image is in 8 bits.

7. A device of claim 4, wherein the latch value setting unit comprises:
  a signal selector which selects one of the plurality of preset values in response to the count control signal;
  a first adder which adds a selected preset value to a normalized count value from the normalizing unit;
  a multiplier which multiplies a scaling signal with a first sum from the first adder; and
  a second adder which adds the selected preset value to a signal from the multiplier and outputs a second sum as a latch value.

8. A device of claim 7, wherein the latch value setting unit further comprises a second signal selecting unit which selects one of either the latch value from the second adder or a preset latch value, in response to a user selecting signal, and which stores the selected latch value in the latching unit.

9. A device of claim 4, wherein the image signal brightness controlling unit comprises:
  a signal selection logic unit which performs a selection logic in response to a comparison signal from the comparing unit and forwards a selection logical signal;
  a signal selector which selects at least one latch value signal in response to the selection logic signal;
  a first multiplier which multiplies a plurality of LSBs (least significant bits) of the image with a first signal from the signal selector;
  an operator which subtracts the plurality of LSBs of the image from a preset value;
  a second multiplier which multiplies a second signal from the signal selector with a signal from the operator;
  an adder which adds the signals from the first and second multipliers; and
  a shifter which shifts a signal from the adder.

10. A method of controlling a brightness of an image comprising:
  (a) obtaining a cumulative density function (CDF) of a frame of the input image, dividing an abscissa of the CDF into a required number of portions, and detecting control points resulting from the division; and
  (b) calculating a change in a brightness of a next frame of the image based upon the CDF and the control points, wherein the change in the brightness of the next frame of the image is selectively adjusted based on latch values selected between default latch values and calculated latch values, and
  wherein the (b) comprises:
    (b1) performing a selection logic in response to a comparison signal from the (a) and forwarding a selection logic signal;
    (b2) selecting at least one latch value signal in response to the selection logic signal;
    (b3) multiplying a plurality of LSBs (least significant bits) of the input image with a first signal from the (b2);
    (b4) subtracting the plurality of LSBs of the image from a preset value;
    (b5) multiplying a second signal from the (b2) with a signal from the (b4);
    (b6) adding the signals from the (b3) and the (b5); and
    (b7) shifting a signal from the (b6).

11. A method of claim 10, further comprising storing an input frame while obtaining the CDF and control points of the input frame in the (a); and
  wherein the (b) includes calculating a change in a brightness of the stored input frame based upon the CDF and control points of the input frame.

12. A method of claim 10, wherein the (a) includes obtaining a CDF and control points of an (n−1)th frame of the image, and calculating a change in a brightness of an nth frame of the image based upon the CDF and control points of the (n−1)th frame of the image.

13. A method for controlling a brightness of an image signal comprising:
  (a1) obtaining a cumulative density function (CDF) of a frame of an input image, dividing the CDF into a required number of portions, and detecting control points resulting from the division to output a plurality of comparison signals and to set latch values; and
  (b1) calculating a change in a brightness of the frame of the input image based upon the plurality of comparison signals and based upon latch values set using a CDF of a previous frame of the input image,
  wherein the latch values are selected between default latch values and calculated latch values, and
  wherein the (a1) comprises:
    (a2) comparing a plurality of MSBs (most significant bits) of the input image to a plurality of preset values and outputting the plurality of comparison signals;
    (b2) counting a number of pixels in the frame of the input image;
    (c2) counting each of the plurality of comparison signals from the (b2) according to a clock signal;
    (d2) normalizing the count values from the (c2) by selecting each one of the count values in response to a count control signal and multiplying a selected count value with a quotient from a maximum range of brightness divided by the number of pixels in the frame of the input image to output corresponding normalized count values;

(e2) setting a plurality of latch values based upon the normalized count values; and (f2) latch a plurality of stored latch value signals.

14. A method of claim 13, wherein the (a1) includes dividing the CDF into four portions resulting in three control points, and the (a2) includes comparing two MSBs of the input image to three preset value points to output three comparison signals based upon the comparison.

15. A method of claim 14, wherein the three control points are 64, 128, and 192, if the input image is in 8 bits.

16. A method of claim 13, where the (e2) comprises:

(a3) selecting one of the plurality of preset values in response to the count control signal;

(b3) adding a selected preset value to a normalized count value from the (d2) and outputting a first sum;

(c3) multiplying a scaling signal with the first sum; and (d3) adding the selected preset value to a product value from the (c3) and outputting a second sum as a latch value.

17. A method of claim 16, wherein the (e2) further comprises selecting one of either the latch value from the (d3) or a preset latch value, in response to a user selecting signal, and storing the selected latch value.

18. A device of claim 13, wherein the (b1) comprises:

(a2) performing a selection logic in response to a comparison signal from the (a1) and forwarding a selection logic signal;

(b2) selecting at least one latch value signal in response to the selection logic signal;

(c2) multiplying a plurality of LSBs (least significant bits) of the input image with a first signal from the (b2);

(d2) subtracting the plurality of LSBs of the image from a preset value;

(e2) multiplying a second signal from the (b2) with a signal from the (d2);

(f2) adding the signals from the (c2) and the (e2); and (g2) shifting a signal from the (f2).

* * * * *